United States Patent [19]
Hojyo

[11] 3,888,745
[45] June 10, 1975

[54] CONTINUOUS AND PARTIAL PLATING PROCESS OF STRIP METAL

[76] Inventor: Tetsuya Hojyo, No. 110, Karasugatsuji-cho, Tennoji-Ku, Osaka, Japan

[22] Filed: Feb. 13, 1974

[21] Appl. No.: 442,094

[30] Foreign Application Priority Data

Feb. 23, 1973 Japan ................................ 48-21907

[52] U.S. Cl. ............ 204/18 R; 101/129; 156/247; 156/344; 204/29

[51] Int. Cl. .............................................. B44d 1/52

[58] Field of Search .......... 117/37 R, 38, 43, 122 H, 117/122 P, 122 PA, 212; 118/213, 301, 406, 504, 505; 161/406; 156/247, 344; 101/48, 50, 121, 122, 129

[56] References Cited

UNITED STATES PATENTS

| | | | |
|---|---|---|---|
| 2,783,193 | 2/1957 | Nieter | 101/129 X |
| 3,040,701 | 6/1962 | Minnick et al. | 101/122 X |
| 3,635,730 | 1/1972 | Sweitzer | 117/38 |
| 3,667,989 | 6/1972 | Keating | 117/38 |

*Primary Examiner*—Thomas J. Herbert, Jr.
*Assistant Examiner*—Bruce H. Hess
*Attorney, Agent, or Firm*—Browdy & Neimark

[57] ABSTRACT

A process of continuous, partial and precise plating of the restricted area on a strip metal, as a material for small electronic parts such as IC lead frame, transistor, connector, etc..

A hot-setting adhesive tape with a hole or slit of a given shape and size is tightly stuck together with the strip metal, and the strip metal is then subjected to plating.

The part of the strip metal uncovered by said hole or slit is plated, but the other part of the metal covered by the tape is not plated, and, thus, precise plating in any desired shape and size on such strip metal is performed easily and economically. The process is normally carried out continuously with a lengthy tape.

6 Claims, 9 Drawing Figures

CONTINUOUS AND PARTIAL PLATING PROCESS OF STRIP METAL

The present invention pertains to a continuous and partial plating process on the restricted surface area of a lengthy strip metal. The strip metal partially plated according to the process of this invention and thereafter punched properly is used for the manufacture of small electronic parts such as IC lead frames, transistors, connectors, etc..

The invention more particularly pertains to a continuous, partial, precise and convenient precious metal plating process of a strip metal, wherein the strip metal, being unrolled from its roll stock, is backed with a hot-setting adhesive tape, being also unrolled from its roll stock and being provided in itself with a hole or slit by a cutting machine like a cutter, thereafter the strip metal with the tape is introduced to a precious metal plating apparatus, such as one of the plating solution bath type, or one fitted with plating solution spraying nozzles where the strip metal is plated on only the area uncovered by the hole or slit made in the tape, and thereafter the tape is separated from the strip metal successively.

In a conventional process, metal parts to be used for the small electronic parts have been manufactured by the method wherein a lengthy strip metal is plated with precious metal all over the surface thereof, and is then punched into desired shapes.

However in this case, the metal pieces punched off are usually useless, and, therefore, precious metal on the pieces has resulted in a great loss. In another conventional process, the metal parts to be used for the small electronic parts have been manufactured in such a manner that desired shapes of metal parts are first punched out of a strip metal, and thereafter the parts are plated with a precious metal like gold on the tip end.

However, due to the reason the shapes of the parts are normally very small and delicate, and yet the plating work requires precise finish, manufacture of the parts usually requires skills in operation and has been very costly.

In accordance with the present invention, there is provided a novel process wherein the strip metal is plated with precious metal, continuously, partially, precisely and conveniently on the desired part. This invention comprises basically the steps of backing a strip metal with a tape, wide enough to cover all the surface area of the strip metal and having a hole or slit in it to expose the part of the strip metal to be plated, at least on one side of the strip metal. Thereafter introducing the strip metal with the tape is introduced into a plating apparatus where precious metal plating is carried out on the exposed part of the strip metal, and thereafter the tape is separated from the strip metal. After the process, the metal parts, to be used for the small electronic parts, are easily and economically obtained from the partially plated strip metal, by using a simple and proper means such as punching.

According to the continuous plating process above mentioned, partial plating of high precision on a strip metal becomes possible, and continuous plating work on a lengthy strip metal prepared in a roll form is also made possible, because the strip metal is tightly covered with a tape for the part not to be plated and uncovered by the hole or slit in the tape for the part to be plated. Then the strip metal with the tape is introduced successively to a plating apparatus in which necessary plating is performed.

Further, when backing of the strip metal with the tape is made with the aid of a hot-setting adhesive, etc., separation of the tape from the strip metal is prevented during the plating step even at the high temperature required therefor, and the desired continuous and homogeneous plating work can be performed easily and at low cost.

This invention may be best understood by reference the following description taken in connection with the accompanying drawings illustrating the embodiments of this invention:

Figure 1:
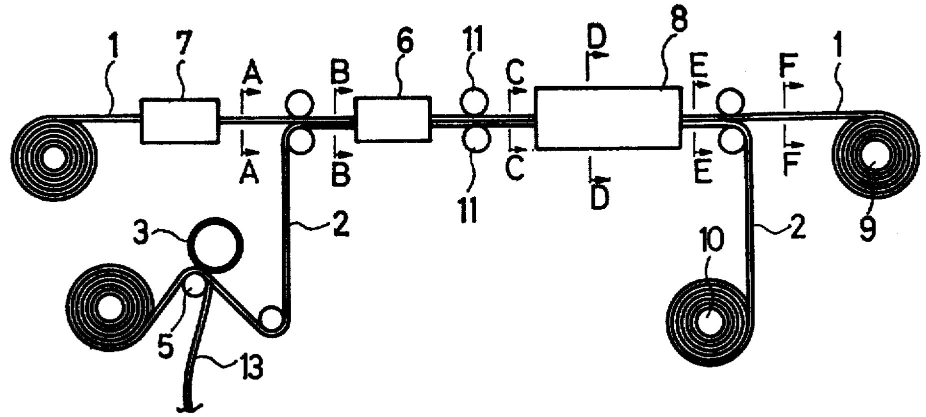
FIG. 1 is a schematic drawing of the overall process of an embodiment of this invention.
Figure 2:
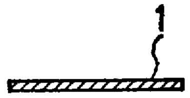
FIG. 2 is a section taken through the line A — A of FIG. 1.
Figure 3:
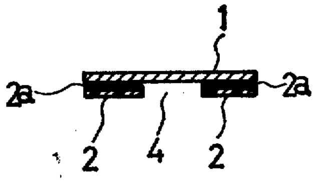
FIG. 3 is a section taken through the line B — B of FIG. 1.
Figure 4:
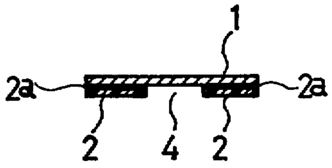
FIG. 4 is a section taken through the line C — C of FIG. 1.
Figure 5:
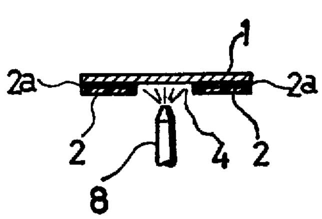
FIG. 5 is a section taken through the line D — D of FIG. 1.
Figure 6:
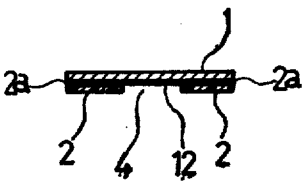
FIG. 6 is a section taken through the line E — E of FIG. 1.
Figure 7:
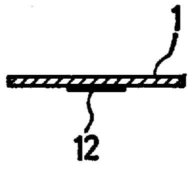
FIG. 7 is a section taken through the line F — F of FIG. 1.

Numeral 1 indicates a strip metal to be continuously plated on its desired part and is prepared in a roll stock.

Numeral 2 indicates a tape having hot-setting adhesive 2*a* on its upper surface, which is adapted not to be corroded with a plating solution, and is wide enough to cover the surface of the strip metal 1 and is also prepared in a roll form.

Numeral 3 indicates a rotary type cutting machine, which is, for instance, provided with a double edge, to produce the continuous slit 4 in the longitudinal direction of the tape 2, which serves to expose the area of the strip metal 1 to be plated. The machine 3 is located along with an adaptor roller 5 mounted under the machine 3 and just before the place where the adhesive tape 2 is put together with the strip plate 1.

The cutting machine should be of high precision in order to make the slit accurately.

Numeral 6 indicates a heating apparatus which is located along the passage of the strip metal 1 accompanied by the tape 2 and serves to actuate the hot-setting adhesive 2*a* and to stick tightly the tape 2 on the strip metal 1.

A preheater 7 is also provided for along the passage of the strip metal 1 for preheating the strip metal 1 to assist the heat-actuation of the adhesive 2*a*.

Numeral 8 indicates a plating apparatus fitted with plating solution spraying nozzles, which is located next to the heating apparatus 6 and jet-sprays a plating solution to the part of the strip metal 1 uncovered by the slit 4 made in the tape 2.

Numeral 9 indicates a drum to wind up the strip metal 1 after it is plated and then separated from the tape 2.

Numeral 10 indicates another drum to wind up the tape 2 after it is separated from the strip metal 1.

Numeral 11 indicates a press roller, and Numeral 12 indicates the plated part of the strip metal 1.

In the above process, it is desirable to arrange said preheater 7, said heater 6 and said plating apparatus 8, etc. on a same level, in order to operate the required unit processes successively according to the flow of the strip metal 1 and the tape 2, and also to provide for a highly accurate rotary type cutting machine 3 in order to cut out the slit 4 as precisely as possible.

The adhesive tape 2 used in the above process is devised for convenience of continuous plating of the strip metal 1, and the hot-setting adhesive 2*a* put on the upper side of the tape 2 is devised to make the tape 2 stick so tightly and strictly on the strip metal 1 that border line between the part to be plated and the part not to be plated on the strip metal 1 is made clear and exact through the slit 4.

Numeral 13 indicates a waste strip being removed while the slit 4 is being made in the tape 2 by the cutting machine 3.

In the case of a plating apparatus 8 fitted with plating solution spraying nozzles, the spraying nozzles are made the anode and the strip metal is made the cathode, respectively.

Figure 9:
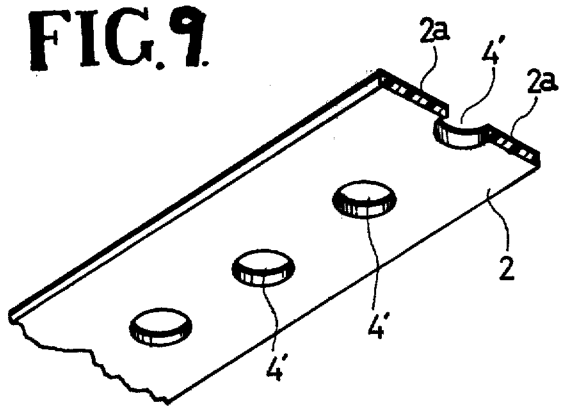
FIG. 9 is a perspective view of a tape with hot-setting adhesive, to be used for another embodiment of this invention.

Apart from the above process as an embodiment of this invention, continuous spot plating on a strip metal 1 is also possible in accordance with the process of this invention. In this case, the tape 2 covered with hot-setting adhesive 2*a* is treated with a punching machine, like a press, in place of the cutting machine 3 beforementioned. The tape, and also the strip metal to move together, are moved through the apparatus intermittently to facilitate the punching work. Holes 4′ positioned at an equal distance from each other, are provided in the tape 2 in the longitudinal direction thereof, as shown in FIG. 9, so that spots on the strip metal to be plated may be exposed repeatedly and regularly.

Incidentally, as the plating apparatus 8 of the strip metal, an apparatus of plating solution bath type is, of course, usable in place of the apparatus with plating solution spraying nozzles aforesaid.

While the process of this invention comprises that described above, the operation is as given below:

The strip metal 1, prepared in a roll form beforehand, is continuously unrolled from the roll stock, preheated through the preheater 7, and then transfered to the heating apparatus 6. On the other hand, the tape provided with hot-setting adhesive 2*a*, prepared in another roll form and located under the said roll of the strip metal 1, is also continuously unrolled from the roll stock and transferred to the rotary type cutting machine 3, which continuously makes the hole or slit 4 in the tape 2 in the longitudinal direction. The hole or slit uncovers the part of the strip metal 1 requiring plating. The tape with the hole or slit is then moved continuously and synchronously with the strip metal 1, and put on the back of the strip metal 1 before being transferred to the heating apparatus 6, along with the strip metal 1. In this case, the tape 2 lightly sticks together on the strip metal 1 with the aid of the hot-setting adhesive 2*a* and the heat given beforehand by the preheater 7. After that, the strip metal 1 and the tape 2 are made to tightly stick together on each other by transferring the same to the heating apparatus 6, where the hot-setting adhesive 2*a* is further more strongly actuated, and then transferring to the press roller 11. Thereafter, the strip metal 1 with the tape 2 is introduced to the plating apparatus 8 and there only the part of the strip metal 1 to be plated, disclosed by the hole or slit 4 in the tape 2, is made to contact with the plating solution and is plated therewith. After the plating step, the tape 2 is continuously separated from the strip metal 1, and, thereafter, the strip metal 1 and the tape 2 are wound up on the drum (9) and the drum (10), respectively.

According to the above plating process of this invention, since the part not to be plated of the strip metal 1 is tightly and strictly covered with the tape 2 and the part to be plated is exposed to plating solution through hole or slit of the tape 2, the border line of the part to be plated is accurately determined without any obscurity and, therefore, an extremely precise partial plating on the strip metal 1 becomes possible.

Besides, since the hole or slit of the tape 2 is not made beforehand at the stage of material preparation, but is made at the stage just before said tape is put together with said strip metal, by the rotary type cutting machine 3, the discrepancy in the relative position between said strip metal and said tape is maintained at a minimum, and accordingly highly precise plating is made possible.

In addition, since the plating solution comes in to contact with only the part of the strip metal 1 uncovered by the hole or slit in the tape 2, any desired shape of plating on said strip metal can be made easily. Further, since the strip metal 1 and the tape 2 with the hole or slit are transferred inseparably, continuous and efficient plating of strip metal 1 can be performed.

Figure 8:
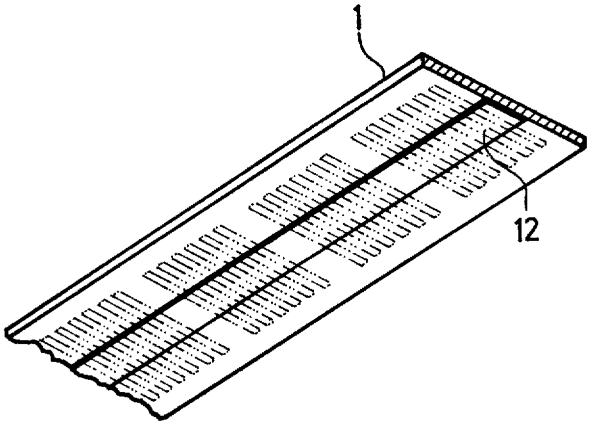
FIG. 8 is a perspective view illustrating the strip metal after the plating process of FIG. 1.

Furthermore, the strip metal 1 partially plated according to the process of this invention enables the efficient manufacture of delicate metal parts, plated at desired positions thereof and used for small electronic parts, by a simple means, for example, by punching the strip metal 1 along the chain line as shown in FIG. 8.

As described above, when plating work is carried out according to the process of this invention, such adventageous effects are obtained that the plating process becomes efficient, continuous plating process is easily and precisely performed, composition and operation of the process are simple, and manufacture of the metal parts with delicate plating can be worked out at low cost.

While the process of this invention has been particularly described and shown on the plating process useful for the manufacture of the partially plated metal parts to be used for the small electronic parts, it will be obvious to those skilled in the art that changes and modifications to other various plating process may be made without departing from this invention in its broader aspects and, therefore, the aim of the appended claims is to cover all such changes and modifications as fall within the true spirit and scope of this invention.

I claim:

1. A process of continuous and partial plating of strip metal comprising the steps of:
   - syncronously supplying a strip of metal and a strip of tape covered with a hot-setting adhesive on one side thereof, said strip of tape having therein a perforation, to be used for uncovering the part of said strip of metal to be plated;
   - bringing together said tape and said strip of metal and causing said tape to stick onto said strip of metal by feeding said tape and said strip of metal through a heating step and thereafter pressing said tape and said strip of metal together;

introducing said strip of metal with said tape adherent thereto to a plating step wherein plating is carried out only on the uncovered part of said strip of metal; and separating said tape from said strip of metal.

2. A process according to claim 1, wherein said perforation is intermittently made in the tape to form a predetermined perforated pattern.

3. A process according to claim 1 wherein a preheating step is provided for said strip of metal before the step where the tape is brought together with the strip metal.

4. A process according to claim 1, wherein the plating step is accomplished by using plating solution spraying nozzles wherein said nozzles are the anode and said strip of metal is the cathode.

5. A process according to claim 1 wherein the plating step is accomplished by a plating solution bath type process.

6. A process according to claim 2 for the manufacture of small electronic components which require the electroplating of a metal thereon, further comprising the step of:

after said separating step, passing said strip of metal through a cutting step wherein the parts of said strip of metal on which plating has occured are cut out of said strip of metal.

* * * * *